US007097368B2

(12) United States Patent
Gonzales

(10) Patent No.: US 7,097,368 B2
(45) Date of Patent: Aug. 29, 2006

(54) CAMERA STABILIZER

(76) Inventor: Rolando Gonzales, 8981 Helenjames Ave., San Diego, CA (US) 92126

( * ) Notice: Subject to any disclaimer, the term of this patent is extended or adjusted under 35 U.S.C. 154(b) by 105 days.

(21) Appl. No.: 10/916,910

(22) Filed: Aug. 12, 2004

(65) Prior Publication Data

US 2005/0069312 A1    Mar. 31, 2005

Related U.S. Application Data

(63) Continuation-in-part of application No. 10/671,977, filed on Sep. 26, 2003, now Pat. No. 7,000,879.

(51) Int. Cl.
*G03B 17/00* (2006.01)

(52) U.S. Cl. ............... 396/420; 396/422; 396/423; 396/428; 352/243

(58) Field of Classification Search ............... 396/420, 396/421, 423, 428, 419, 422; 348/373, 376; 352/243; 224/908
See application file for complete search history.

(56) References Cited

U.S. PATENT DOCUMENTS

| 2,552,205 | A |   | 5/1951 | Moss | 95/86 |
|---|---|---|---|---|---|
| 2,806,416 | A | * | 9/1957 | Jones, Jr. | 294/139 |
| 4,017,168 | A | * | 4/1977 | Brown | 352/243 |
| 4,244,500 | A |   | 1/1981 | Fournier | 224/265 |
| D302,561 | S |   | 8/1989 | Goins | D16/242 |
| 4,943,820 | A | * | 7/1990 | Larock | 396/423 |
| 5,332,136 | A | * | 7/1994 | Rudolph | 224/185 |
| 5,462,214 | A | * | 10/1995 | Buswell | 224/679 |
| D382,286 | S |   | 8/1997 | Doran | D16/242 |

FOREIGN PATENT DOCUMENTS

EP    0122332 A1    10/1984

OTHER PUBLICATIONS

Advertisement for Camera Supports, B.H. Photo Video [www.bhphotovideo.com], Mar. 2003.

* cited by examiner

*Primary Examiner*—W. B. Perkey
*Assistant Examiner*—Rishi Suthar
(74) *Attorney, Agent, or Firm*—Frank G. Morkunas

(57) ABSTRACT

A camera stabilizer having a base with an aperture in front and in back, and in alignment with one other. A shoulder support, removably attachable to the base, has an adjustable rod extending forward of it with a detent at its distal end. The adjustable rod inserts into the base through its two apertures with the detent passing through the front aperture to prevent rearward movement of the adjustable rod. A second support removably attaches to the base. It has two telescoping rods connected to each other at their bottoms from which they are pivotable. Adjustable straps on one telescoping rod are adapted to wrap around one's back and fasten to themselves for greater stability. Another strap at the bottom of one telescoping rod is adapted to loop around one's belt and fasten to itself thereby providing addition stability and vertical support.

24 Claims, 4 Drawing Sheets

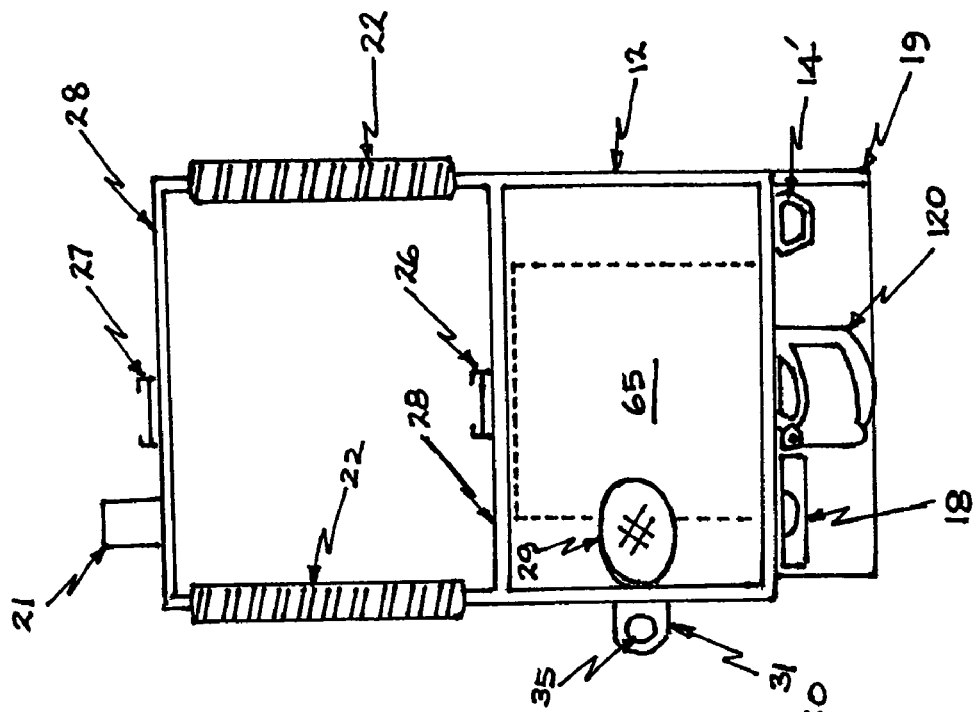
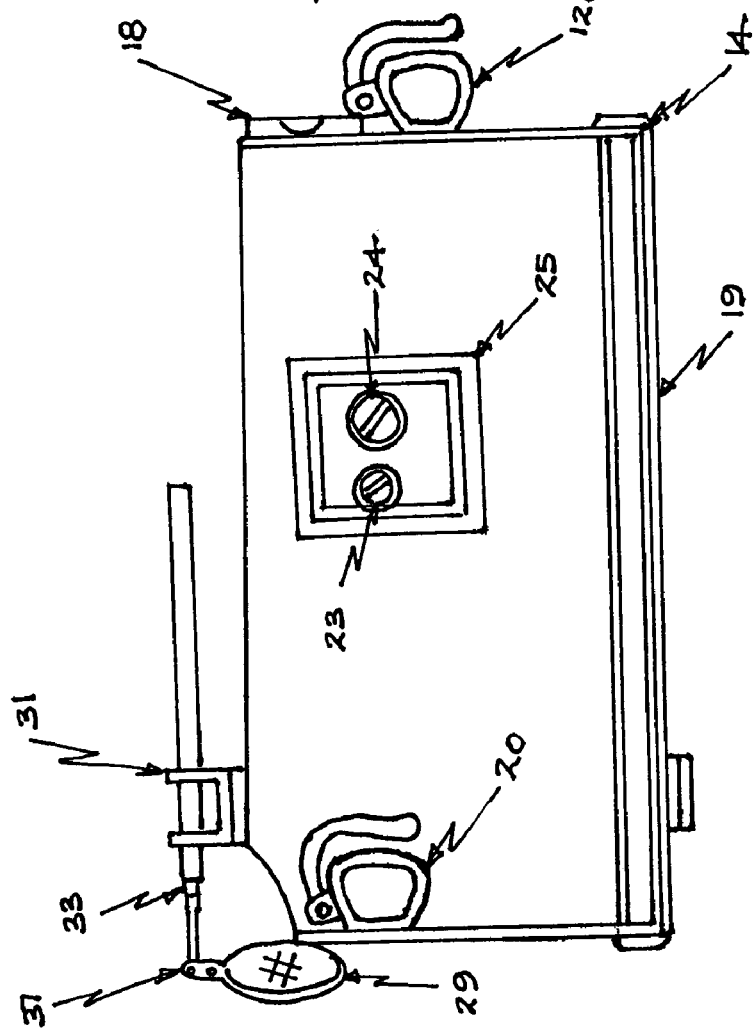

CAMERA STABILIZER

CROSS REFERENCES TO RELATED APPLICATIONS

This application is a continuation-in-part of my application, application Ser. No. 10/671,977, filed on Sep. 26, 2003, now U.S. Pat. No. 7,000,879.

STATEMENT REGARDING FEDERALLY-SPONSORED RESEARCH OR DEVELOPMENT

None.

BACKGROUND OF THE INVENTION

This present invention relates to an improvement in camera supports and more particularly to camera stabilizers.

A steady camera for still pictures or moving pictures [movie camera or video camera] makes for better more professional finished pictures. A camera for still pictures, because of its shutter speed, can be hand-held and still be capable of capturing a good quality picture. For more professional results, tripods are generally used.

Holding a moving camera or video camera by hand to capture moving pictures can typically yield a 'jittery' result [for the purpose of all further discussion, such moving pictures will be referred to herein as 'video' and the device as 'video camera' and includes all types of cameras capable of capturing and presenting moving pictures—it must be understood, however, that the camera stabilizer of the present invention may be used with all types of cameras; still, moving, 35 mm, digital, and the like]. Tripods can be used but, once set up, their use is limited in scope in that once the tripod is set on the ground, it generally stays put and the camera operator swivels the mounted camera up and down and back and forth as needed. Should an event require the camera operator to move about to better capture the moments, the end result of the video will be jittery.

Various, more portable and mobile, camera supports and stabilizers have been crafted to meet the needs of the video camera operator to minimize or completely eliminate the jitter effect when recording moving events and moving with the event to better capture it. Most typically involve some form of adjustable rod attachable to the video camera with some form of support structures mountable onto a camera operator. In many different forms, these generally involve some form of telescoping rod from video camera to the operator at or near the operator's shoulder with another telescoping rod from video camera to the operator at or near the operator's waist or chest thereby forming a triangular support structure well-suited for stabilizing the video camera.

All the prior art camera support devices are either complicated in structure and use; costly to manufacture and, concomitantly, costly to buy; and, in spite of the complexities of the device and high cost, do not offer flexibility of use nor do they provide for greater versatility in use. Most merely support the video camera without according the user more features necessary to produce more professional results. My co-pending application referenced above fills that void. This continuation-in-part present invention enhances upon my previously filed application.

Accordingly, several objects and advantages of my invention are to:

a. provide an advantage for near- and far-sighted users to permit either to easily use either an LCD monitor for viewing or the viewfinder of the video camera;

b. produce an inexpensive camera stabilizer which provides excellent vertical and horizontal support for a video camera;

c. provide additional support between operator and camera by stabilization means around the operator's back and upward in a bi-pod [also referred to as V-pod] configuration from a user's waist to the camera;

d. provide a camera stabilizer which may easily function as a mono-pod support for a camera, a bi-pod support for a camera, and accommodate an external tri-pod;

e. introduce a camera stabilizer which easily assembles and dis-assembles;

f. provide for a camera stabilizer which is easily adjustable and extremely easy to use;

g. provide a camera stabilizer which facilitates the use of remote control devices and other camera-related components;

h. create a camera stabilizer which assists the camera operator in registering a level plane; and i. make an easily portable and storable camera stabilizer capable of easy storage and movement from one site to another site.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a camera stabilizer for a camera. The camera stabilizer has a base with an aperture in front and in back, each aperture in alignment with the other. A first support member is contoured for fit on a user's shoulder. It has an adjustable rod extending outward and forward of the support member with a detent member at its distal end. The adjustable rod inserts into the base through its two apertures with the detent passing through the front aperture thereby preventing rearward movement of the adjustable rod. A second support member has two telescoping rods connected to each other at their respective bottoms from which they are pivotable. The tops of each rod also are pivotable and removably attachable to the base. Adjustable straps on one telescoping rod are adapted to wrap around the user's back and fasten to themselves to thereby more securely stabilize the device. Another strap at the bottom end of one of the telescoping rods is adapted to loop around the belt of a user and fasten to itself thereby providing addition stability and vertical support.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 2 is a rear elevation view of the base component of the camera stabilizer.

FIG. 3 is a bottom plan view of the base component of FIG. 2.

DETAILED DESCRIPTION OF THE INVENTION

Figure 1:
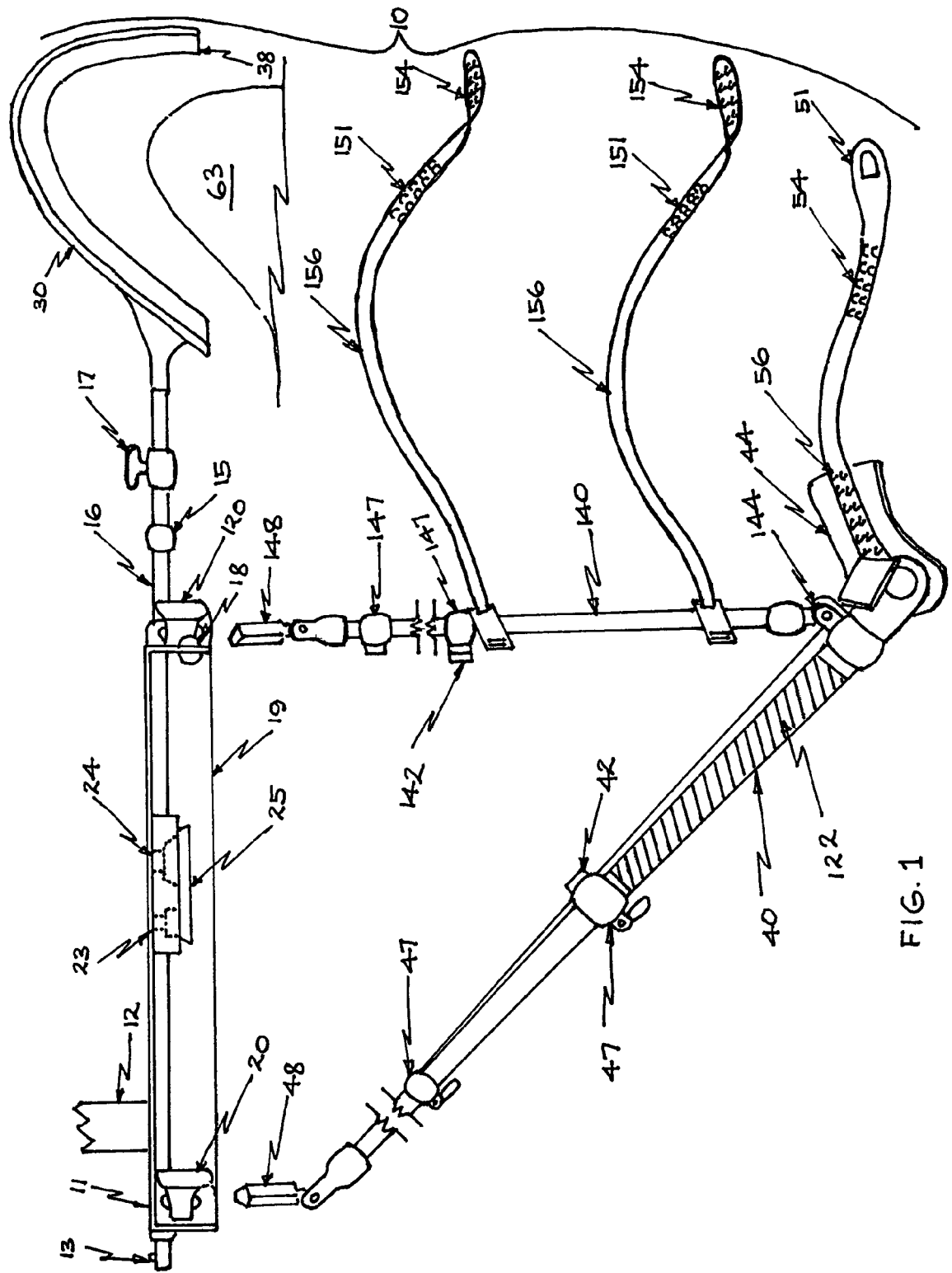
FIG. 1 is a side elevation view of the camera stabilizer [in its bi-pod configuration] and a majority of its component parts.

Referring now to the drawings in detail and in particular to FIG. 1, reference character 10 generally designates a camera stabilizer constructed in accordance with a preferred embodiment of the present invention. The base component 11 supports and secures a camera. Most cameras have a threaded aperture on their bottom for mounting the camera onto a tripod for example. In this regard, the camera may be placed on top of the base 11, aligned with aperture 24, and secured thereon by a correspondingly threaded bolt.

Additionally a tripod mounting shoe 25, with its threaded bolt, may be incorporated onto the bottom of the base 11, to accept and secure a camera mounted onto the top of the base 11. The tripod mounting shoe 25 envisioned for this purpose is a conventional quick-release tripod mounting shoe; i.e., one which easily attaches to and releases from a tripod by movement of a single lever and, concomitantly, easily attaches to and releases from the bottom of the base 11. Most such tripod mounting shoes 25 also have an alignment guide-pin which, when placed onto the tripod, align with a receiving aperture on the tripod thereby registering the fit of the tripod mounting shoe onto the tripod.

To accommodate such guide-pins, the base 11 is configured with an alignment aperture 23. This permits easy attachment of the tripod mounting shoe 25 onto the bottom of the base 11 and for easy and quick securement of a camera to the top of the base 11. At the rear of the base 11, and visible to a user, is leveling device 18, such as, but not limited to a bubble-type level. At or near to the front of the base 11 is a reflective device 29 [illustrated in FIGS. 3 and 4] the purpose of which is to reflect the transmission of a signal from a remote control device for an external object [e.g., a video camera] to that external object [the video camera].

Figure 4:
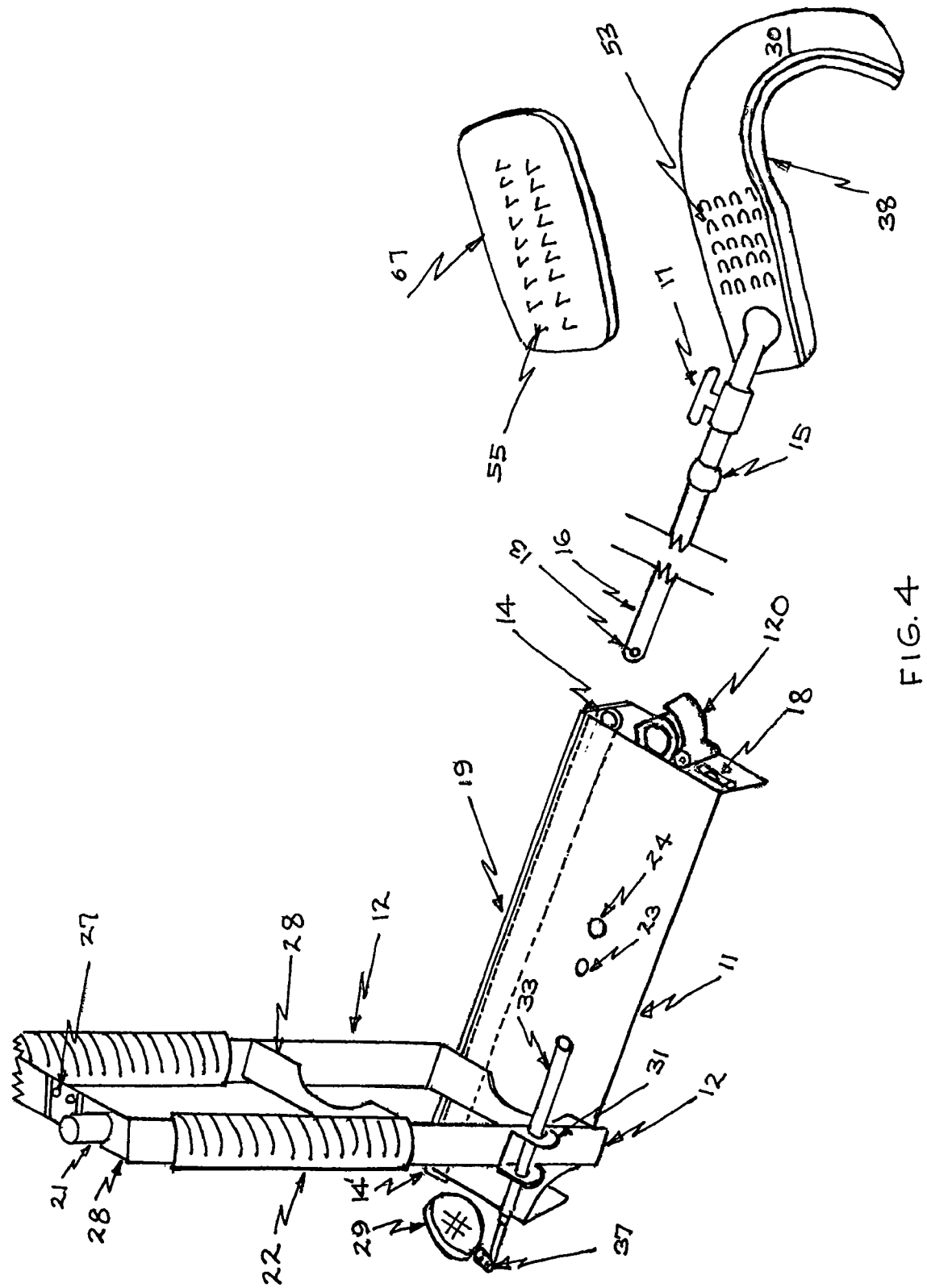
FIG. 4 is a perspective view of the base and rear support component.

As illustrated in FIGS. 2–4, the mirror 29 is connected to an adjustable rod 33, preferably a telescoping rod. The mirror 29 is pivotably connected to the adjustable rod 33 at the forward end 37 of the adjustable rod 33. On one side of the base 11, is a mirror receiver component 31 having one or more apertures 35 and adapted to removably receive the adjustable rod 33 and mirror 29 combination.

A side plate 19 extending downward from the base 11 provides support and comfort for a user's hand. Typically video cameras have a strap on the side of the video camera into which a user may insert the user's fingers with the palm-side against the video camera. Also, typically, the thumb of the user is outside of the strap. The side plate 19 provides a place to support the user's hand when the hand is inserted into the strap of the video camera. This side plate 19 also permits the user to better manipulate the video camera as attached to the base 11. This side plate 19 may, but need not, run the full length of the base 11 from front to rear.

When the camera stabilizer 10 is fully assembled, with camera attached, and is attached to the user 63, this permits a user to establish a perfect horizontal plane when the situation may call for such. On the base 11 there are two apertures 14, 14' in alignment with one another. These apertures 14, 14' are adapted to connect to the base 11 the support member 30 by receiving and maintaining therein the adjustable rod member 16 attached to and extending forward from the support member 30.

The adjustable rod member 16 extends forward from the support member 30. At its distal end, it has a bias member or detent 13. The distal end is passed through the rear aperture 14 of the base 11 and through the front aperture 14' of the base 11 such that the detent 13 passes forward of the base 11. Once the adjustable rod member 16 is through both apertures 14, 14' backward movement and slippage out of the base 11 is prevented by the detent 13. A stopper 15 on the adjustable rod member 16 is located at a distance greater than the longitudinal length [front to back] of the base 11. This stopper 15 prevents excessive forward movement of the adjustable rod member 16 and provides greater stability. The detent 13 prevents undesired backward movement of the adjustable rod member 16. With the stopper 15 preventing forward movement and the detent 13 preventing backward movement, the adjustable rod member 16 is securely attached to the base 11. Once so secured, the distance between base 11 and first support member 30 may be made and, with the locking device 17 on the adjustable rod member 16, so locked in place.

Typically, adjustable rod member 16 is a telescoping-type rod having a lock member 17 on it for locking and unlocking on the telescoping component of the adjustable rod member 16 to permit the user to adjust the support member 30 to any desired length away of the base 11. Support member 30 is adapted to rest on the user's 63 shoulder. As illustrated in FIG. 1 it is contoured on the bottom 38 to fit onto the user's shoulder. This contoured bottom 38 should be made of a soft or pliable material to provide a cushioned support and comfort for the user. The adjustable rod member 16 is securely and non-removably attached to the support member 30. It may, but need not be, pivotable at this point of attachment.

Once the adjustable rod member 16 is attached to the base 11 as described above, the support member 30 is placed on a user's 63 shoulder. As described above, the detent 13 and stopper 15 prevent excessive forward and rearward movement of the adjustable rod member 16. The user may unlock lock member 17 and telescope adjustable rod member 16 forward or rearward as desired. Once the desired length is attained, the user may lock lock member 17 in place.

A second support member comprised on a first adjustable rod component 40 and a second adjustable rod component 140 is adapted to attach at each respective upper end 48, 148 to a respective attachment member 20, 120 on the bottom of the base 11. The bottom end 144 of the second adjustable rod component 140 is pivotably attached to the first adjustable rod component 40 at or near to the bottom end 44 of the first adjustable rod component 40. The bottom end 44 of the first adjustable rod component 40 attaches to the user.

The bottom end 44 of first adjustable rod component 40, has a fastening member 51 which is adapted to fasten to the belt or, if the user is belt-less, to any strap-like member [neither shown] provided to and worn by the user 63. The fastening member 51 may have corresponding hook-and-loop 54, 56 fastening components. Any suitable fastening component will suffice. What is important is that the fastening member 51 be fastenable to the user 63 at approximately waist level to provide that sturdy triangular support created by using the camera stabilizer 10.

After suitable back and forth [up and down] movement and adjustment of each adjustable rod component 40, 140, as desired by the user, this second support member may be locked into position by respective locking member 47, 147 on each adjustable rod component 40, 140. Each end point of each adjustable rod component 40, 140 [top end 48 and bottom end 44 of first adjustable rod component 40 and top end 148 and bottom end 144 of second adjustable rod component 140, may be swiveable or pivotable. This swivel/pivot feature permits the user to freely move about, twist and turn, as necessary without adversely affecting the stability of or support for the mounted camera.

For additional support and stability, the second adjustable rod component 140 has one or more adjustable strap-like members 151. As illustrated in FIG. 1, there are two such strap-like members 151. Each strap-like member 151 has fastening members on it. As illustrated, corresponding hook-and-loop 154, 156 fastening members are used. One component of the hook-and-loop 154 is shown at the tip of each strap-like member 151 while the corresponding component of the hook-and-loop 156 is shown to be adjacent to the second adjustable rod component 140 and extending sufficiently toward the other component 154 such that, when a user wraps the strap-like member around his back, the distal end fastening component 154 is attachable to any section of the strap-like member 151 containing the corresponding fastening component 156.

To further ease use of the camera stabilizer system, grip members 22, 122 are on each adjustable rod component 40, 140. These grip members 22, 122 are conventional grip components as typically used for tennis rackets or golf clubs. They should be soft, pliable, and, preferably, non-slick.

First adjustable rod component 40 and second adjustable rod component 140, as configured, resemble a draftperson's compass, pivoting, from one end of attachment 144 to each other, open and closed and to any open point in between at the other ends 48, 148. When in a closed position, a holding component 42, 142 on each adjustable rod component 40, 140, in alignment with one another, maintains the second support member 40, 140 in a closed position and prevents unwanted openings. The holding component 42, 142 may be cooperating hook-and-loop fasteners as described above.

Therefore, with the camera 65 mounted on the base 11; the first support member 30 and the second support member 40, 140 attached to the base 11; the first support member 30 rested onto a user's shoulder; the second support member 40, 140 is attached to the user with fastening member 51 attached approximately waist high and adjustable strap members 151 wrapped around a user's back and connected together with cooperating fastening components 154, 156, an extremely sturdy and steady camera support system is created.

Figure 5:
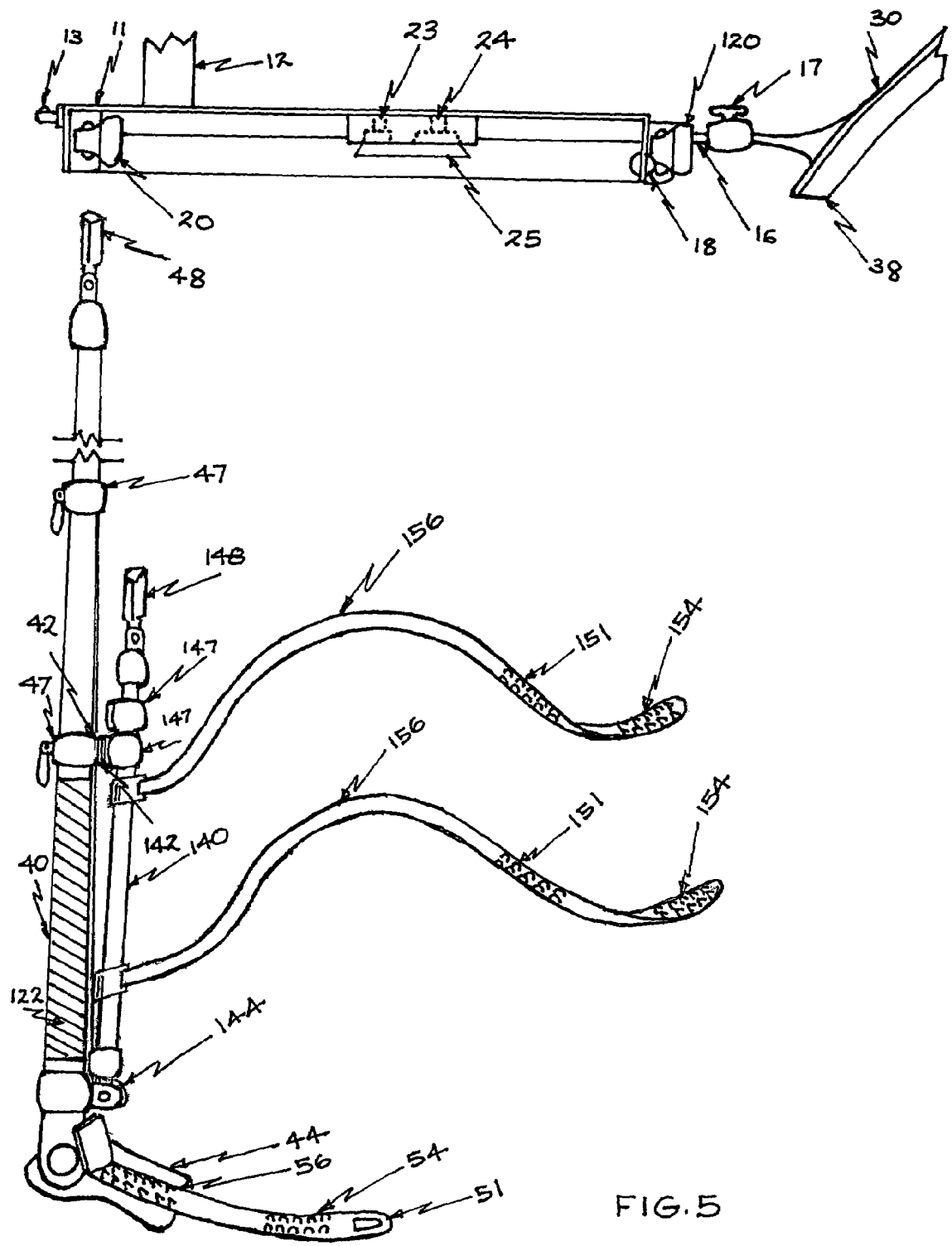
FIG. 5 is a detailed partial view of the camera stabilizer in a mono-pod configuration.

A secondary and unique feature of this second support member 40, 140 is that it may function independent of the first support member 30. Attaching to the base 11 only the second support member 40, 140 as described above establishes a mono-pod support for the camera eliminating the need for a tripod. FIG. 5 illustrates this concept and functionality. The mono-pod may be unlocked, telescoped up and down as needed and locked into place as described above but, as a mono-pod, is not attached to a user. The bottom end 44 of the first adjustable rod component 40 is rested on the ground or floor as the case may be.

FIG. 2 illustrates yet additional features of the camera stabilizer 10. This figure highlights the features of the base 11 as viewed from the rear. The level 18 is at the rear. Also at the rear is a receiving aperture 14 into which the adjustable rod member 16 enters the base 11. An external object [camera] is illustrated in phantom line as reference character 65. Extending upward from the base 11 is a support handle 12. One or more such support handle 12 may extend upward from the base 11.

The purpose of the support handle 12 is to aid the user in holding, gripping, and maneuvering the camera to and toward objects of interest to be captured on film. Two such support handles 12 are shown and at least two are best suited for the intended purpose. One or more vertically disposed extension 28 extend from the support handle 12 on one side of the base 11 to the support handle 12 on the opposite side of the base 11. A camera accessory mounting shoe 26, 27 may be on any one or more of the vertical extensions 28. These mounting shoes 26, 27 are adapted to receive any conventional camera accessory such as, but not limited to, a flash and a light meter.

An extension 21 on top of the upper most vertical extension 28 also serves to accept an external video light [not shown]. This video light holder 21 is adapted to accept and hold a conventional video light which may be necessary to illuminate the objects to be filmed in situations where natural lighting is insufficient for that purpose.

It is preferred that there be at least two support handles 12 and that there be at least two vertical extensions 28 connecting to each support handle 12 as illustrated in FIG. 4. A gripping member 22 may be on either or both support handles 12. It is best that the gripping member 22 be soft and not slick for its purpose is to permit the user to obtain a sure grip on the camera stabilizer 10. This gripping member may be foam [covered or uncovered], cushion, tape, rope, or string and it may be made of any material suited for the intended purpose.

The first support member 30 also may have on its top, a coupling component 53 onto which an external object 67 may be attached. If a video camera 65 is used as the object supported on the base 11, a suitable external object 67 for the video camera 65 may be a remote control device. The coupling component 53 of choice is hook-and-loop. As illustrated the loop element is represented by reference character 53 and is on the first support member 30 while the hook element is represented by reference character 55 and is on the remote control device [though the corresponding coupling components may be reversed; i.e., hook element on the first support member 30, loop element on the remote control device].

For many video cameras, having the remote control positioned as such on the shoulder simplifies the operation of the camera in that, the controls on the video camera itself for many video cameras are not well placed for ease of operation with or without use of a tripod or camera stabilizer or support. Remote control devices, on the other hand, are more user-friendly. Therefore, having the capability of using a remote control device with a video camera 65 mounted onto the camera stabilizer 10 of the present invention clearly simplifies use of the video camera 65 in conjunction with the camera stabilizer 10.

The reflective device [mirror] 29 permits this to happen. The remote control device must be placed and positioned onto the first support member 30 such that the signal the remote control device transmits can be reflected off the mirror 29 and onto the photosensor of the receiving component; i.e., the camera 65 of such signal.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not by the embodiment illustrated, but by the appended claims and their legal equivalents.

The invention claimed is:

1. A camera stabilizer for use with a camera, said camera stabilizer comprising:
   a base having a top, a bottom, a front, and a rear, wherein said front has a first aperture and said rear has a second aperture wherein said first aperture is aligned with said second aperture;
   first support means for providing support for the base, said first support means having an adjustable telescoping rod at one end and at the other end a shoulder brace wherein said adjustable telescoping rod has a biased detent member at its distal end and wherein said adjustable telescoping rod is adapted to insert through said second aperture, traverses the bottom of said base and enters into and through said first aperture and be held therein; and
   second support means for providing support for the base, said second support means comprising a first adjustable telescoping member and a second telescoping adjustable member, each said adjustable telescoping member having a top end and a bottom end, wherein the bottom end of said second adjustable telescoping member is pivotably connected to said first adjustable telescoping member and each said adjustable telescoping member is removably attached to said base at each respective said top end.

2. The camera stabilizer in claim 1 wherein said top end of each said adjustable telescoping member is pivotable.

3. The camera stabilizer in claim 1 wherein said first and said second adjustable telescoping members further comprise gripper means for aiding a user in gripping said camera stabilizer.

4. The camera stabilizer in claim 1 wherein said first adjustable telescoping member or said second adjustable telescoping member or both have one or more connecting means for attaching said second support means firmly to a user.

5. The camera stabilizer in claim 4 wherein said one or more connecting means comprises a strap member having fastening means thereon for fastening one end of said strap member to an opposite end of said strap member.

6. The camera stabilizer in claim 5 wherein said fastening means comprises cooperating hook-and-loop type fasteners.

7. The camera stabilizer in claim 1 wherein said second support means further comprises holding means on said first adjustable telescoping member and on said second adjustable telescoping member for securely holding said first adjustable telescoping member to said second adjustable telescoping member when said adjustable telescoping members are pressed against each other.

8. The camera stabilizer in claim 7 wherein said holding means comprises cooperating hook-and-loop type fasteners.

9. The camera stabilizer in claim 1 further comprising leveling means on said base for establishing a proper horizontal frame of reference.

10. The camera stabilizer in claim 9 wherein said leveling means comprises a bubble level at the rear of said base.

11. The camera stabilizer in claim 1 further comprising a tripod mounting shoe attachable to the bottom of said base.

12. The camera stabilizer in claim 1 wherein said first support means further comprises a coupling means for receiving and securely holding an external object.

13. The camera stabilizer in claim 1 further comprising reflection means for reflecting and directing a photosensor transmitting signal from a remote control device for the camera to a corresponding photosensor receiver on the camera.

14. The camera stabilizer in claim 13 wherein said reflection means comprises a mirror removably attached to said base.

15. The camera stabilizer in claim 14 wherein said reflecting means further comprises a telescoping rod attached to said mirror at one end and to said base at its opposite end.

16. The camera stabilizer in claim 15 wherein said mirror is pivotably connected to said telescoping rod.

17. The camera stabilizer in claim 1 further comprising one or more upstanding handles on said base.

18. The camera stabilizer in claim 17 further comprising gripping means on said one or more upstanding handles, said gripping means for aiding a user in holding and supporting the camera stabilizer.

19. The camera stabilizer in claim 17 further comprising one or more vertically disposed extensions on said one or more upstanding handles.

20. The camera stabilizer in claim 19 further comprising a mounting shoe on one or more of said one or more vertically disposed extensions.

21. The camera stabilizer in claim 1 further comprising a first attaching member and a second attaching member on the bottom of said base, said attaching members adapted to receive said first adjustable telescoping member and said second adjustable telescoping member of said second support means.

22. The camera stabilizer in claim 21 wherein said first adjustable telescoping member further comprises attaching means for attaching said bottom end to a user.

23. The camera stabilizer in claim 22 wherein said attaching means comprises fastener means thereon for fastening one end of said attaching means to an opposite end of said attaching means.

24. The camera stabilizer in claim 23 wherein said fastener means comprises cooperating hook-and-loop type fasteners.

* * * * *